US012364299B2

(12) United States Patent
Wei et al.

(10) Patent No.: US 12,364,299 B2
(45) Date of Patent: Jul. 22, 2025

(54) PREPARATION METHOD OF A GARMENT WITH AUTOMATIC OPENING

(71) Applicants: SANLIUYIDU (CHINA) CO., LTD., Fujian (CN); SANLIUYIDU (FUJIAN) SPORTS GOODS CO., LTD., Fujian (CN)

(72) Inventors: Shutao Wei, Fujian (CN); Keqin Wang, Fujian (CN); Huilian Dai, Fujian (CN); Yang Liu, Fujian (CN); Caixia Liao, Fujian (CN)

(73) Assignees: SANLIUYIDU (CHINA) CO., LTD., Quanzhou (CN); SANLIUYIDU (FUJIAN) SPORTS GOODS CO., LTD., Quanzhou (CN)

( * ) Notice: Subject to any disclaimer, the term of this patent is extended or adjusted under 35 U.S.C. 154(b) by 0 days.

(21) Appl. No.: 18/010,829

(22) PCT Filed: Jun. 30, 2022

(86) PCT No.: PCT/CN2022/102677
§ 371 (c)(1),
(2) Date: Dec. 16, 2022

(87) PCT Pub. No.: WO2023/115892
PCT Pub. Date: Jun. 29, 2023

(65) Prior Publication Data
US 2024/0225158 A1    Jul. 11, 2024

(30) Foreign Application Priority Data

Dec. 21, 2021 (CN) .......................... 202111569844.4

(51) Int. Cl.
*A41D 27/28*  (2006.01)
*A41D 31/12*  (2019.01)
(Continued)

(52) U.S. Cl.
CPC ............. *A41D 27/28* (2013.01); *A41D 31/12* (2019.02); *B32B 37/06* (2013.01); *B32B 37/10* (2013.01);
(Continued)

(58) Field of Classification Search
CPC ...... A41D 27/28; A41D 31/12; A41D 31/125; B32B 38/04; B32B 38/10;
(Continued)

(56) References Cited

U.S. PATENT DOCUMENTS

2007/0161305 A1 * 7/2007 Wangbunyen ....... A41D 27/285
442/79

FOREIGN PATENT DOCUMENTS

EP    1806061 A1    7/2007
WO   2008016253 A1   2/2008

OTHER PUBLICATIONS

Editorial Committee of Encyclopedia of Chemical Engineering, Section 3.2: Transfer Coating, Natural Medicine—Inorganic Peroxide and Peroxide Compound, Encyclopedia of Chemical Engineering, vol. 16, Dec. 31, 1997, p. 478, Chemical Industry Press.

* cited by examiner

*Primary Examiner* — John L Goff, II

(57) ABSTRACT

A preparation method of a garment with automatic opening, includes: firstly, a garment opening preform is manufactured, and then an automatic opening garment is prepared by using the preform. In the preform, one or more functional layers with predetermined shapes and sizes are connected to the positioning layer; when the clothing needs to be opened, the preform only needs to be connected with the area to be opened of the clothing, and the incision is made according to the position of the functional layers, so that the positioning is not required by a pair of incisions on the clothing, which is efficient, convenient, concise and easy to adjust, (Continued)

and provides a convenient and accurate template function for the opening of the clothing, namely, opening and using. The functional layer of the garment opening preform is made of hydrophilic material or hydrophobic material.

10 Claims, 5 Drawing Sheets

(51) Int. Cl.
*B32B 37/06* (2006.01)
*B32B 37/10* (2006.01)
*B32B 38/10* (2006.01)
*D05B 1/04* (2006.01)
*B32B 38/00* (2006.01)

(52) U.S. Cl.
CPC ............... *B32B 38/10* (2013.01); *D05B 1/04* (2013.01); *B32B 2038/008* (2013.01); *B32B 2305/188* (2013.01); *B32B 2309/02* (2013.01); *B32B 2309/12* (2013.01)

(58) Field of Classification Search
CPC ........ B32B 2038/008; B32B 2307/724; B32B 2437/00; B32B 37/025; Y10T 156/1056; Y10T 156/1057; Y10T 156/1082; Y10T 156/1089; Y10T 156/1092; D05B 1/04
USPC ................................. 156/239, 240, 247, 248
See application file for complete search history.

PREPARATION METHOD OF A GARMENT WITH AUTOMATIC OPENING

TECHNICAL FIELD

The present invention relates to the technical field of garment fabric production, in particular to a preparation method of a garment with automatic opening.

BACKGROUND ART

Excellent moisture permeability is one of the common goals of the current research and development of clothing, especially sportswear. In the industry, dense vent structures or changing the composition ratio of fabrics are usually used to improve the moisture absorption rate and air permeability, etc. However, the function of such air permeability is fixed and cannot be adjusted according to the state of perspiration and non-perspiration, so it is easy to catch cold in cold wind. There are also designs that can be opened and closed by opening the opening and installing a zipper at the opening, but it needs manual operation. Besides, the clothes are not light enough and the appearance is not simple enough after adding a zipper. How to prepare clothes that can automatically adjust the breathable and moisture permeable structure according to the state of human perspiration or not is an urgent problem to be solved at present.

SUMMARY

The purpose of the present invention is to provide a preparation method of a garment with automatic opening.

The present invention aims to solve the technical problem of how to prepare clothes which can automatically adjust the air-permeable and moisture-permeable structure according to whether the human body perspires or not.

To realize the purpose of the present invention, the present invention adopts the following technical scheme:

A preparation method of a garment with automatic opening, which includes the following steps:
  S1. Preparing a garment opening preform: the garment opening preform comprises:
  A functional layer with a predetermined shape and size, made of hydrophilic material or hydrophobic material; Used for positioning the opening of the garment to be opened and matching with the fabric layer of the opened garment to automatically open or close the opening of the garment;
  A positioning layer having an inner side, and one or more of the functional layers are connected to a part of the inner side;
  The first connecting layer is arranged between the positioning layer and the functional layer and is used for connecting the functional layer and the positioning layer; The shape and size of the first connecting layer are the same as or suitable for the functional layer;
  The second connecting layer is connected at least to a part of the inner side of the area where the functional layer is not connected; Is used for connecting the preform with the garment to be opened to position the garment opening;
  The adhesive layer is connected to one side of the functional layer far away from the positioning layer, and is used for subsequent connection between the functional layer and clothing fabrics, and the shape and size of the adhesive layer are the same as or suitable for the functional layer.

S2. The garment opening preform is used to prepare the garment with automatic opening: the garment opening preform is fixed on the fabric layer of the garment to be opened through the second connecting layer, the fabric layer, the adhesive layer and the functional layer are combined into a composite body, and the composite body is carved and opened to make the fabric layer have a penetrating incision stitch; Removing the positioning layer, the second connecting layer and the first connecting layer, and obtaining the product;
  The number of incision stitch is the same as that of the functional layers, the shape of incision stitch is the same as that of one side or two interconnected sides of the functional layers, and the opening positions of incision stitch correspond to the distribution positions of the side edges.

Furthermore, the first connecting layer and the second connecting layer are the same layer (the same preparation materials, structures, thicknesses, etc.), and they are connected into a whole to form an integral connecting layer and cover the whole inner side;

The step S1 includes the following steps:
  S11. The positioning layer, the integral connecting layer, the initial functional layer and the initial adhesive layer are compounded into a preform composite by hot pressing, and the initial functional layer and the initial adhesive layer do not have the predetermined shape and size;
  S12. Engraving and cutting the initial functional layer and the initial adhesive layer of the preform composite by electronic engraving, so that one or more of the functional layers and the adhesive layers with predetermined shapes and sizes appear on the positioning layer;
  S13. Removing portions of the initial functional layer and the initial adhesive layer that do not have the predetermined shape and size; Retaining one or more of the functional layer and the adhesive layer with the predetermined shape and size;

In step S12 and step S13, the positioning layer remains unchanged.

Furthermore, the positioning layer, the first connecting layer and the second connecting layer are integrated products.

Further, the first connecting layer and the second connecting layer may not be the same layer or connected to each other as a whole, and the step S1 may include the following steps:
  S11. The positioning layer, the initial first connecting layer, the initial functional layer and the initial adhesive layer are compounded into a preform composite by hot pressing, and the initial first connecting layer, the initial functional layer and the initial adhesive layer do not have the predetermined shape and size;
  S12. Engraving and cutting the initial first connecting layer, the initial functional layer and the initial adhesive layer of the preform composite by electronic engraving, so that one or more of the functional layers and the adhesive layers with predetermined shapes and sizes appear on the positioning layer;
  S13. Removing the parts of the positioning layer other than one or more of the functional layer, the adhesive layer and the first connecting layer with a predetermined shape and size;
  S14. Part or all of the second connecting layer is connected to the area of the positioning layer where the functional layer with a predetermined shape and size is not connected;

In step S12 and step S13, the positioning layer remains unchanged.

Further, the second connecting layer is distributed on the four corners or edges of the inner side.

Furthermore, the functional layers are evenly distributed on the inner side of the positioning layer at intervals.

Furthermore, in the preform, the side of the adhesive layer far away from the functional layer is also connected with a protective film.

Further, the cross section of the functional layer is semi-circular, and the incision stitch is an arc line; Or the cross section of the functional layer is triangular, and the incision stitch is a V-shaped line.

Further, the functional layer is connected to one side of the garment fabric layer close to human skin, and the functional layer is a hydrophilic material layer, the moisture absorption rate of which is higher than that of the garment fabric layer; Or the functional layer is connected to one side of the garment fabric layer far away from human skin, and the functional layer is a hydrophobic material layer, and the moisture absorption rate of the hydrophobic material layer is lower than that of the garment fabric layer.

Further, in step S2, the fabric layer, the adhesive layer and the functional layer are compounded into a composite body by hot pressing, with the hot pressing temperature of 140-160° C., time of 15-25 seconds and pressure of 3-5 kg.

Compared with the prior art, the present invention has the following beneficial effects:

According to the present invention, firstly, a garment opening preform is designed and manufactured, and then a garment with automatic opening is prepared by using the preform. In the opening preform, one or more functional layers with predetermined shapes and sizes are connected to a positioning layer through a first connecting layer, and a second connecting layer is arranged in the area of the positioning layer where the functional layers are not connected, and the second connecting layer is used for connecting the preform with the garment to position the garment opening. When the garment needs to be opened, Only the preform needs to be connected with the area to be opened of the garment, and the incision is made according to the position of the functional layer, without positioning a pair of incisions on the garment, which is convenient, concise and easy to adjust, and provides a convenient and accurate template function for the opening of the garment, that is, it is ready to use.

The functional layer of the garment opening preform provided by the present invention is made of hydrophilic material or hydrophobic material, which is matched with the garment fabric with incision stitch, and the incision stitch can be automatically opened or closed according to whether the human body perspires or not by utilizing the difference of moisture absorption rate between the functional layer and the garment fabric layer, so that the air permeability and moisture permeability are improved, and the wearing comfort is improved.

Figure 1:
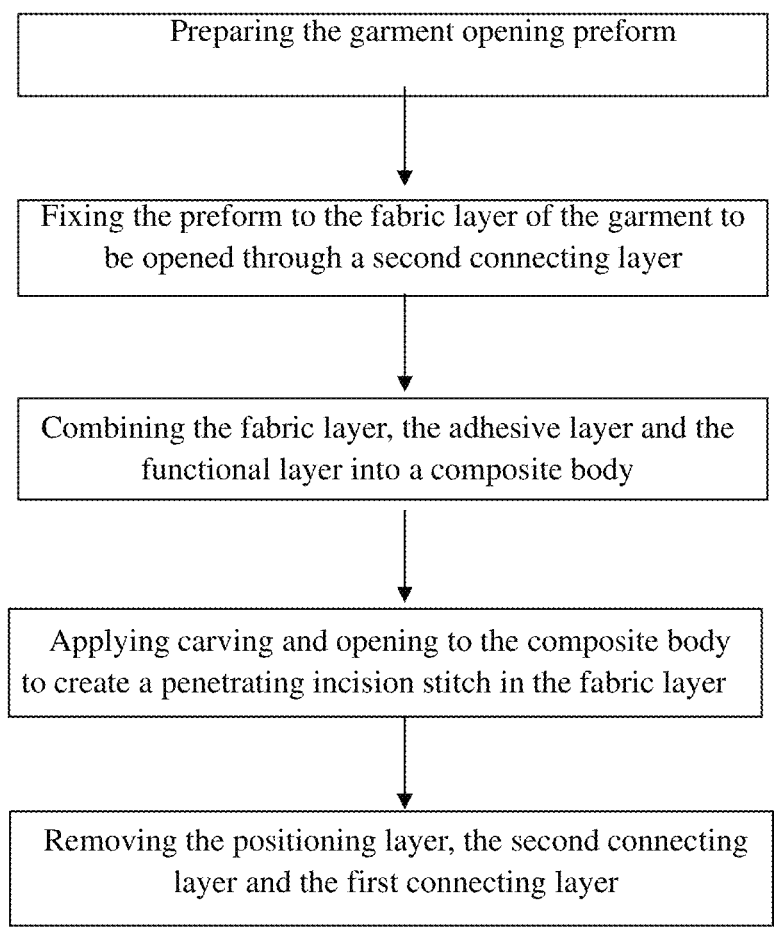
FIG. 1: Flow chart of the preparation method of a garment with automatic opening provided by an embodiment of the present invention.

Where:
1. Preform, 11. Functional layer, 12. Positioning layer, 131. First connecting layer, 132. Second connecting layer, 14. Adhesive layer;
2. Garment with automatic opening, 21. Garment fabric layer, 22. Incision stitch.

Embodiments

In the prior art, there is a technical problem that the breathable and breathable function of the garment (garment fabric) is difficult to be adjusted automatically according to the state of human body sweating or not.

Therefore, the present invention proposes a new scheme to prepare a garment that can automatically adjust the breathable and breathable structure according to the state of human sweating or not.

For a clearer representation, the following is a detailed description of the present invention in combination with the accompanying drawings and specific embodiments.

Referring to FIGS. 1-6, the present invention provides a preparation method of a garment with automatic opening, which first prepares a garment opening preform 1, and then uses the garment opening preform 1 to prepare a garment with automatic opening 2.

Specifically, the preform 1 includes a functional layer 11, a positioning layer 12, a first connecting layer 131, a second connecting layer 132, and an adhesive layer 14. Therein, with reference to FIG. 2, the functional layer 11 has a predetermined shape and size, and a plurality of functional layers 11 are attached to a portion of an area of the inner side 121 of the positioning layer 12, the plurality of functional layers 11 being evenly spaced on the inner side 121 of the positioning layer 12. Referring to FIG. 3, a first connecting layer 131 is provided between the functional layer 11 and the positioning layer 12 for connecting the functional layer 11 to the positioning layer 12, and a second connecting layer 132 is provided on at least part of the area of the inner side 121 to which the functional layer is not connected, for connecting the preform 1 to the garment to be opened when the open garment is subsequently made, in order to position the opening for the garment to be opened. An adhesive layer 14, attached to the side of the functional layer 11 away from the positioning layer 12, is used to subsequently connect the functional layer 11 to the garment fabric layer 21, the shape and size of the adhesive layer 14 being the same as or compatible with the functional layer 11. The preform 1 contains the adhesive layer 14, and the shape and size of the adhesive layer 14 is the same as the predetermined shape and size of the functional layer 11 can be more accurate and convenient to use when subsequently connecting with the garment fabric layer, and avoid the problems of inconvenient positioning, increased labor and adhesive material residue when covering the adhesive layer directly on the garment fabric layer.

When it is necessary to open the garment, it is only necessary to connect the preforms 1 with the area of the garment to be opened and make the incision according to the position of the functional layer 11, without using the machine to line up the garment one by one and then make the incision, which is convenient and simple, easy to adjust (connection position) and more accurate positioning, providing a convenient and accurate template role for the garment opening, which is ready to use.

Functional layer 11, is a hydrophilic material layer made of hydrophilic material, or hydrophobic material layer made of hydrophobic material. The hydrophilic material has a higher moisture absorption rate than an ordinary garment fabric, such as a polyurethane/polyethylene composite film or cotton; the hydrophobic material has a lower moisture absorption rate than an ordinary garment fabric, such as polyester or nylon. The functional layer 11 cooperates with the garment fabric layer 21 having the incision stitch, and the difference in moisture absorption between the functional layer 11 and the garment fabric layer 21 is used to make the incision stitch open or close automatically according to the human body sweating or not, so as to improve the breathability and moisture permeability performance and enhance the wearing comfort.

Figure 2:
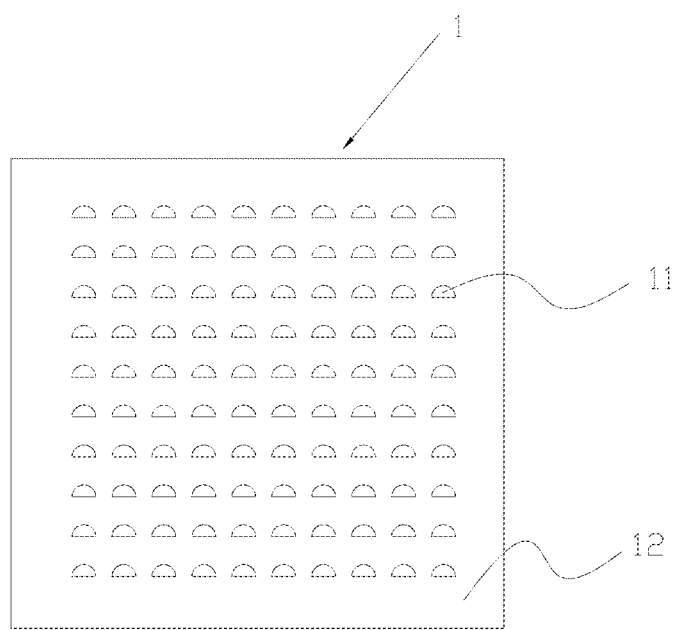
FIG. 2: A schematic diagram of the structure of the garment opening preform provided by an embodiment of the present invention.
Figure 3:
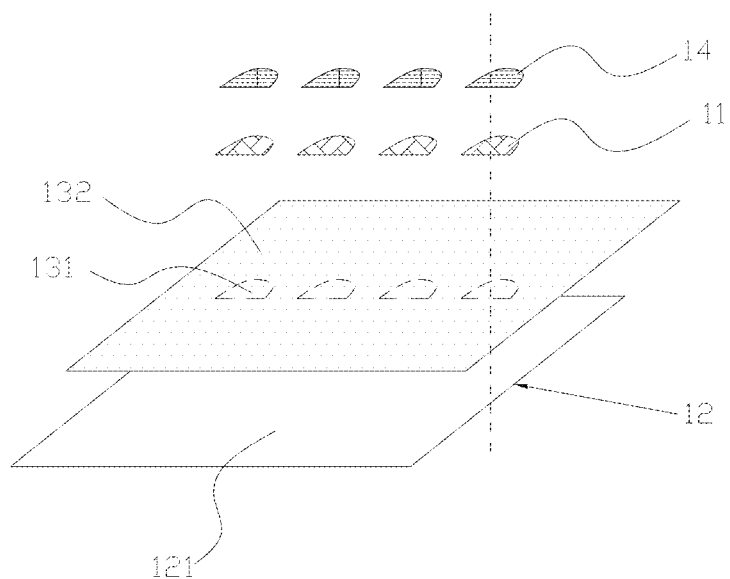
FIG. 3: A schematic diagram of the structure decomposition of the garment opening preform provided by an embodiment of the present invention.

Referring to FIG. 2, in a specific embodiment, the cross-sectional shape of the plurality of functional layers 11 is semi-circular and of the same size. It is easy to understand that the shape, number, size and arrangement distribution of the functional layer 11 are designed according to the opening design of the garment to be opened, which can be changed according to the garment design needs, and can be a uniform shape, a uniform size, or a variety of shapes, a variety of sizes, and can be a plurality of evenly spaced arrangement distribution, or can be irregularly arranged. For example, the functional layer of the uniform semicircle in this embodiment corresponds to the shape of the garment opening seam as a uniform circular line (see FIG. 5 later). In another embodiment, the cross-section of the plurality of functional layers 11 may also be uniformly triangular (not shown), in which case their corresponding garment opening seams are shaped as uniform V-shaped lines. In other embodiments, the shape of the plurality of functional layers 11 may also be horseshoe, crescent, star, or any combination thereof, etc. In one embodiment, the number of functional layers 11 is a plurality, which allows the cutouts for the garment to be opened to be produced in bulk; in other embodiments, the number of functional layers 11 may also be one, such as an individual unique or prominent shape design.

As a further improvement, the adhesive layer 14 may also have a protective film (not shown in the FIGS.) attached to the side of the adhesive layer 14 away from the positioning layer 11 so that the functional layer 11 and the adhesive layer 14 are not damaged before subsequent attachment to the garment fabric layer 21.

The positioning layer 12 is used to carry the functional layer 11, which may be a transparent plastic film smooth on both sides for easy observation during subsequent attachment to the garment fabric, or it may be a release paper. The positioning layer 12 is connected to the functional layer 11 by a first connecting layer 131, which is for example a low viscosity adhesive layer, and a second connecting layer 132 is attached to the part of the inner side 121 of the positioning layer 12 that is not covered/connected with a functional layer.

Referring to FIG. 3, in one embodiment, the first connecting layer 131 and the second connecting layer 132 are the same layer, which are joined together and cover the entire inner side. This is convenient to make and can make the subsequent paste positioning better. As a further improvement, the positioning layer 12 and the first connecting layer 131 and the second connecting layer 132 can also be a one-piece product, for example, a commercially available PET film with low adhesion, so that raw materials are easy to obtain and easy to implement.

When the first connecting layer 131 and the second connecting layer 132 are the same layer, and both are integrated to form a monolithic connecting layer and cover the whole inner side; the preparation of the preform 1 includes the following steps:

S11. Combining the positioning layer 12, the integral connecting layer (the integral connecting layer does not have the predetermined shape and size and may be an untreated integral/whole piece form, and the initial shape and size may be the same as or compatible with the shape and size of the positioning layer), the initial functional layer (the initial functional layer does not have the predetermined shape and size and may be an untreated integral/whole piece form), the initial adhesive layer (the initial adhesive layer does not have the predetermined shape and size and may be in untreated monolithic/whole sheet form, e.g. a whole hot melt adhesive film) are laminated by hot pressing to form a preform composite;

S12. Engraving and cutting of the initial functional layer and initial adhesive layer of the preform composite using electronic engraving (e.g. laser engraving, laser, etc.) so that one or more functional layers 11 (and adhesive layer 14) with a predetermined shape and size appear on the positioning layer 12;

S13. Removing portions of the initial functional layer and the initial adhesive layer that do not have the predetermined shape and size; retaining one or more functional layers 11 and adhesive layers 14 having the predetermined shape and size;

In steps S12 and S13, the positioning layer 12 remains unchanged.

In other embodiments, the second connecting layer 132 may also be attached to only a portion of the area on the inner side 121 that does not have the functional layer 11 attached to it. i.e., the area on the inner side 121 that does not have the first connecting layer 131 attached to it does not all have the second connecting layer 132 attached to it, as long as it is able to achieve attachable positioning with the subsequent garment fabric. At this time, the second connecting layer 132 can be distributed on the four corners or edges of the inner side 121 (can be shown with reference to the blank area in FIG. 2), and the first connecting layer 131 and the second connecting layer 132 can be made of the same material, or can be made of different materials.

When the first connecting layer 131 and the second connecting layer 132 are not the same layer, the preparation of the preform 1 comprises the following steps:

S11. Laminating the positioning layer 12, the initial first connecting layer, the initial functional layer and the initial adhesive layer into a preform composite by hot pressing, the initial connecting layer, the initial functional layer and the initial adhesive layer not having the predetermined shape and size, all three may be of the same size and shape as the positioning layer or correspondingly in a monolithic or whole piece form;

S12. Engraving and cutting the initial first connecting layer, the initial functional layer and the initial adhesive layer of the preform composite using electronic engraving, so that one or more functional layers 11 and adhesive layers 14 and the first connecting layer 131 with predetermined shapes and sizes appear on the positioning layer;

S13. Removing the parts of the positioning layer other than one or more functional layers 11, the adhesive layer 14 and the first connecting layer 131 with predetermined shapes and sizes;

S14. Part or all of the second connecting layer 132 is connected to the area of the positioning layer where the functional layer with a predetermined shape and size is not connected;

In step S12 and step S13, the positioning layer remains unchanged.

In the present invention, with reference to FIG. 1-FIG. 6, the preparation of a garment with automatic opening 2 using the garment opening preform 1 comprises the following steps: fixing the garment opening preform 1 to the fabric layer 21 of the garment to be opened by means of the second connecting layer 132, laminating the fabric layer 21, the adhesive layer 14 and the functional layer 11 into a composite body, laser engraving the opening of the composite body so that the fabric layer 21 to create a penetrating incision stitch in the fabric layer; remove the positioning layer, the second connecting layer and the first connecting layer, that is.

Specifically, the above steps can be further refined as follows:

(1) Aligning and connecting (e.g. gluing) the second connecting layer 132 of the garment opening preform 1 to the area of the garment to be opened with the pre-set incision stitch 22, which preferably corresponds to the area of the garment where the human body sweats more, such as the underarm sides, the chest, the back (referable to FIG. 6), etc.;

(2) The functional layer 11 of the preform 1, the adhesive layer 14 and the garment fabric layer 21 to be opened are joined by means of hot pressing, so that the three are formed as one; the temperature of the hot pressing is 140-160° C., preferably 150°° C., the time is 15-25 seconds, preferably 20 seconds, and the pressure is 3-5 kg, preferably 4 kg.

(3) Using laser engraving to engrave the incision stitch in accordance with the shape and position of the side edges of the functional layer 11 (either a curved side edge, such as a circular arc, or two adjacent connected side edges, such as a V-shaped line);

(4) Removing/tearing the positioning layer 12, the first connecting layer 131 and the second connecting layer 132, when the three are one-piece finished products (e.g. PET film), it is sufficient to directly remove the one-piece finished product.

Figure 4:
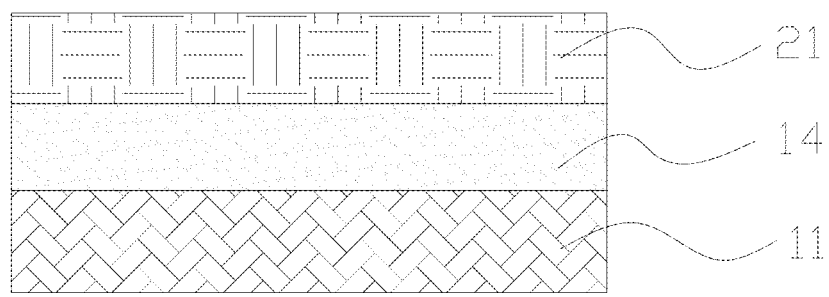
FIG. 4: Schematic diagram of the cross-sectional structure of a garment with automatic opening provided by an embodiment of the present invention.
Figure 5:
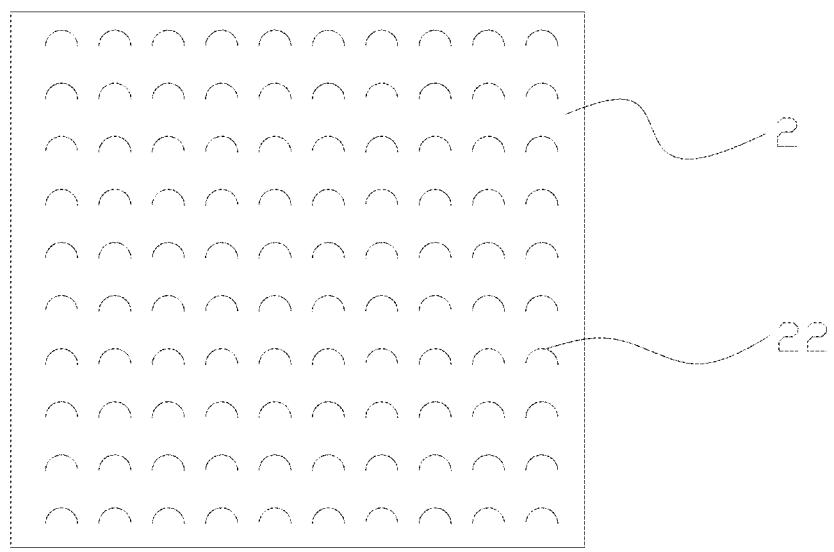
FIG. 5: A partial front view of a garment with automatic opening provided by an embodiment of the present invention.
Figure 6:
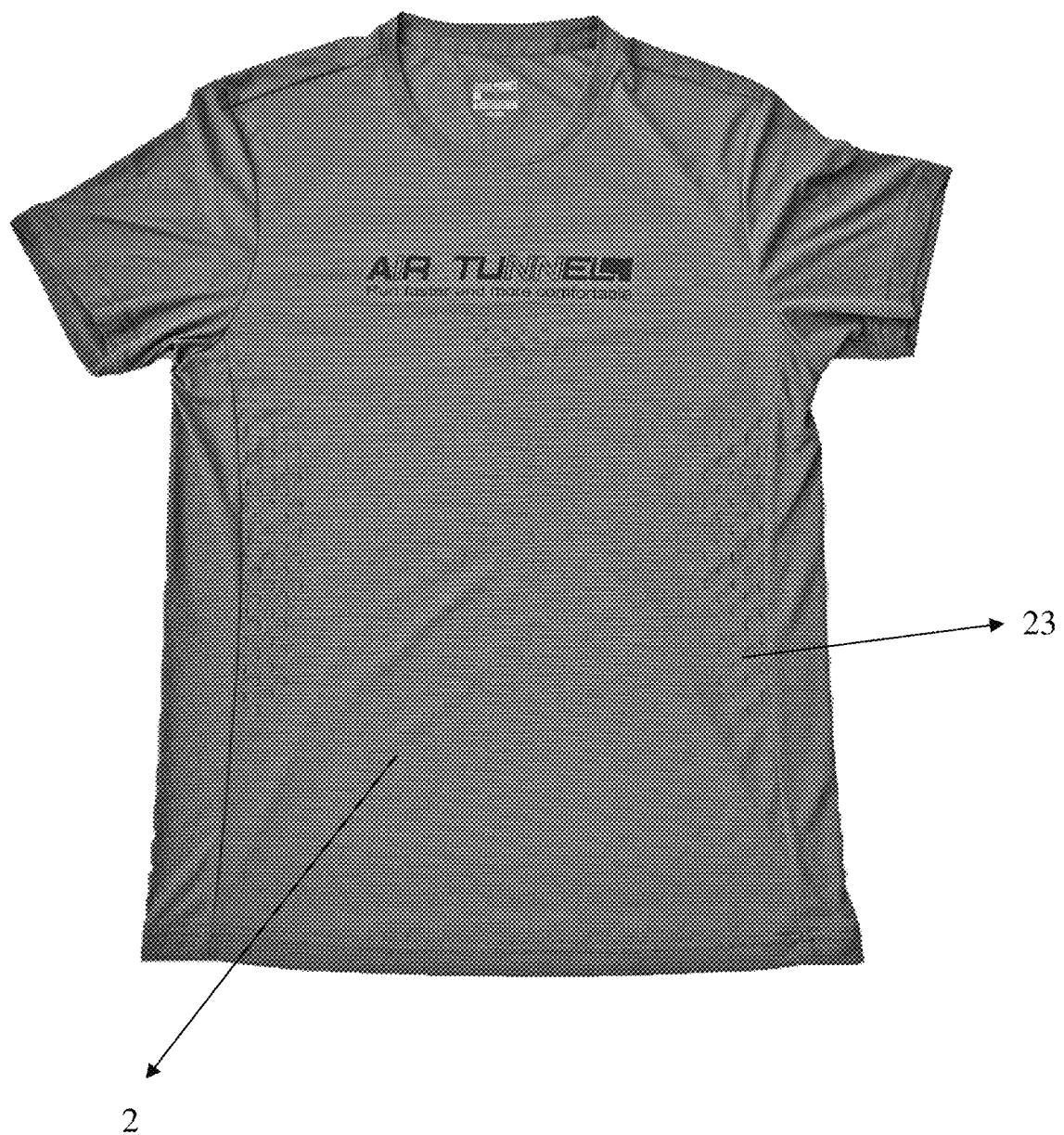
FIG. 6: A physical example diagram of a garment with automatic opening prepared using the present invention.

Referring to FIGS. 4-6, a garment with automatic opening 2 includes a functional layer 11 of the preform 1, a garment fabric layer 21 and an adhesive layer 14, which is provided between the functional layer 11 and the garment fabric layer 21 to achieve mutual bonding. The adhesive layer 14 may be a hot melt adhesive film, which may be one of polyamide, polyester, polyethylene and polyester amide, such as Bemis adhesive film.

The garment fabric layer 21 is provided with incision stitch 22 throughout, the number of incision stitch 22 is the same as the number of functional layers 11, the shape of the incision stitch 22 is the same as one side or two interconnected sides of the functional layer 11, and the open seam position of the incision stitch 22 corresponds to the side distribution position. For example, the functional layer 11 has a semicircular cross-section, corresponding to the incision stitch 22 as a circular line (see FIG. 5); or the functional layer 11 has a triangular cross-section, and the incision stitch is a V-shaped line (not shown). The seam width of the incision stitch is 1-6 mm, for example 1 mm, 2 mm, 3 mm, 4 mm, 5 mm, 6 mm, preferably 4 mm.

In a specific embodiment, the functional layer 11 can be attached to the side of the garment fabric layer 21 near the human skin, when the functional layer 11 is a hydrophilic material layer, the hydrophilic material layer has a higher moisture absorption rate than the garment fabric layer 21, the hydrophilic material layer is for example PU high permeability film; when the human body sweats, the hydrophilic material layer near the incision stitch 22 absorbs moisture and expands and elongates more than the garment fabric layer 21. Thus, it is pulled apart by the garment fabric layer 21, which is located on the outside with a short elongation, making the incision stitch 22 open automatically, increasing the contact area between the surface of human skin and the outside air, accelerating the evaporation of sweat and heat dissipation; when the human body does not sweat and returns to a dry state, the pulling force disappears and the incision stitch 22 closes automatically again.

In another specific embodiment, the functional layer 11 can also be attached to the side of the garment fabric layer 21 away from the human skin, when the functional layer 11 is a hydrophobic material layer, the hydrophobic material layer has a lower moisture absorption rate than the garment fabric layer 21, when the human body sweats, the garment fabric layer 21 near the incision stitch 22 absorbs moisture and expands and elongates more than the hydrophobic material layer, thus being located on the outside with a short elongation of the hydrophobic, which makes the incision stitch 22 automatically open. When the body does not sweat and returns to the dry state, the pulling force disappears and the incision stitch 22 closes automatically.

The garment provided by the present invention can automatically open (can automatically open the incision stitch) through the functional layer with the garment fabric layer, using the difference in moisture absorption rate between the functional layer and the garment fabric layer, so that the incision stitch can automatically open or close according to the human body sweating or not, improving the breathable and moisture permeable performance and enhancing the wearing comfort.

The above embodiments are only used to explain the technical solution of the present invention and not to limit it. Although the above embodiments provide a specific description of the present invention, the relevant technical person should understand that modifications or equivalent replacements can still be made to the specific implementation of the present invention, and any modifications and equivalent replacements that do not depart from the spirit and scope of the present invention shall be covered by the scope of the claims of the present invention.

What is claimed is:

1. A preparation method of a garment with automatic opening, comprising the following steps:
   S1) preparing a garment opening preform: the garment opening preform comprises:
   one or more functional layers each having a predetermined shape and size, made of hydrophilic material or hydrophobic material;
   a positioning layer having an inner side, and one or more of the functional layers are connected to a part of the inner side;
   a first connecting layer is arranged between the positioning layer and the one or more functional layers and is used for connecting the one or more functional layers and the positioning layer;

a second connecting layer is connected at least to a part of the inner side of an area where the functional layers are not connected;

an adhesive layer is connected to a side of the functional layers farthest away from the positioning layer;

S2 the garment opening preform is used to prepare the garment with automatic opening: the garment opening preform is fixed on a fabric layer of the garment to be opened through the second connecting layer, the fabric layer, the adhesive layer and the functional layers are combined into a composite body, and the composite body is carved and opened to make the fabric layer have a penetrating incision stitch; removing the positioning layer, the second connecting layer and the first connecting layer, and obtaining the product;

the number of each incision stitch is the same as that of the functional layers, the shape of each incision stitch is the same as that of one side or two interconnected sides of the functional layers, and the opening positions of each incision stitch correspond to the distribution positions of the sides of the functional layers.

2. The preparation method of the garment with automatic opening according to claim 1, wherein the first connecting layer and the second connecting layer are the same layer, and they are connected to form an integral connecting layer and cover the whole inner side;

the step S1 includes the following steps:

S11) the positioning layer, the integral connecting layer, an initial functional layer and an initial adhesive layer are compounded into a preform composite by hot pressing, and the initial functional layer and the initial adhesive layer do not have the predetermined shape and size;

S12) engraving and cutting the initial functional layer and the initial adhesive layer of the preform composite by electronic engraving, so that one or more of the functional layers and the adhesive layer with predetermined shapes and sizes appear on the positioning layer;

S13) removing portions of the initial functional layer and the initial adhesive layer that do not have the predetermined shape and size; retaining one or more of the functional layers and the adhesive layer with the predetermined shape and size;

in step S12 and step S13, the positioning layer remains unchanged.

3. The preparation method of the garment with automatic opening according to claim 2, wherein the positioning layer, the first connecting layer and the second connecting layer are integrally formed as a finished product.

4. The preparation method of the garment with automatic opening according to claim 1, wherein:

the step S1 includes the following steps:

S11) the positioning layer, an initial first connecting layer, an initial functional layer and an initial adhesive layer are compounded into a preform composite by hot pressing, and the initial first connecting layer, the initial functional layer and the initial adhesive layer do not have the predetermined shape and size;

S12) engraving and cutting the initial first connecting layer, the initial functional layer and the initial adhesive layer of the preform composite by electronic engraving, so that one or more of the functional layers and the adhesive layer with predetermined shapes and sizes appear on the positioning layer;

S13) removing one or more parts of the positioning layer not including the functional layers, the adhesive layer and the first connecting layer with a predetermined shape and size;

S14) part or all of the second connecting layer is connected to the area of the positioning layer where the functional layers with a predetermined shape and size are not connected.

5. The preparation method of the garment with automatic opening according to claim 4, wherein the second connecting layer is distributed on four corners or edges of the inner side.

6. The preparation method of the garment with automatic opening according to claim 1, wherein the functional layers are evenly distributed on the inner side of the positioning layer at intervals.

7. The preparation method of the garment with automatic opening according to claim 1, wherein in the preform, the side of the adhesive layer farthest away from the functional layers is also connected with a protective film.

8. The preparation method of the garment with automatic opening according to claim 1, wherein the cross section of the functional layers is semicircular, and the incision stitch is a circular arc line; or the cross section of the functional layers is triangular, and the incision stitch is a V-shaped line.

9. The preparation method of the garment with automatic opening according to claim 1, wherein the functional layers are connected to one side of the garment fabric layer closest to human skin, and each functional layer is a hydrophilic material layer, and the moisture absorption rate of the hydrophilic material layer is higher than that of the garment fabric layer; or the functional layers are connected to one side of the garment fabric layer farthest away from human skin, and each functional layer is a hydrophobic material layer, and the moisture absorption rate of the hydrophobic material layer is lower than that of the garment fabric layer.

10. The method for preparing the garment with automatic opening according to claim 1, wherein in step S2, the fabric layer, the adhesive layer and the functional layers are compounded into a composite body by hot pressing, and the hot pressing temperature is 140-160° C., the time is 15-25 seconds and the pressure is 3-5 kg.

* * * * *